(12) United States Patent
DePree

(10) Patent No.: US 7,380,009 B2
(45) Date of Patent: May 27, 2008

(54) METHOD, SYSTEM AND PROGRAM PRODUCT FOR DELAYED DISCONNECTION OF A CLIENT FROM A SERVER

(75) Inventor: Jeffrey Todd DePree, Durham, NC (US)

(73) Assignee: Interantional Business Machines, Incorporated, Armonk, NY (US)

( * ) Notice: Subject to any disclaimer, the term of this patent is extended or adjusted under 35 U.S.C. 154(b) by 1028 days.

(21) Appl. No.: 10/636,391

(22) Filed: Aug. 7, 2003

(65) Prior Publication Data
US 2005/0044240 A1  Feb. 24, 2005

(51) Int. Cl.
*G06F 15/16* (2006.01)

(52) U.S. Cl. ............ 709/227; 709/202; 709/203; 709/228

(58) Field of Classification Search ............ None
See application file for complete search history.

(56) References Cited

U.S. PATENT DOCUMENTS

| | | | |
|---|---|---|---|
| 6,336,135 B1 * | 1/2002 | Niblett et al. | 709/215 |
| 6,557,038 B1 * | 4/2003 | Becker et al. | 709/227 |
| 6,598,082 B1 * | 7/2003 | Douglis et al. | 709/227 |
| 6,981,212 B1 * | 12/2005 | Claussen et al. | 715/513 |
| 2002/0138728 A1 * | 9/2002 | Parfenov et al. | 713/170 |
| 2002/0165954 A1 * | 11/2002 | Eshghi et al. | 709/224 |
| 2002/0172931 A1 * | 11/2002 | Greene et al. | 434/322 |
| 2002/0176377 A1 * | 11/2002 | Hamilton | 370/328 |
| 2003/0140089 A1 * | 7/2003 | Hines et al. | 709/202 |
| 2004/0268357 A1 * | 12/2004 | Joy et al. | 718/105 |
| 2006/0161639 A1 * | 7/2006 | Kato | 709/219 |

* cited by examiner

*Primary Examiner*—John B. Walsh
(74) *Attorney, Agent, or Firm*—A. Bruce Clay; Hoffman, Warnick & D'Alessandro, LLC

(57) ABSTRACT

When a request for a web page is received on a server from a client, the web page is returned to the client with a client program (e.g., an applet) and a program tag. The program tag specifies a session identifier corresponding to the client. Once the web page is loaded, a start method is initiated on the client to cause a (start) message to be sent to the server. The start message causes any running disconnection timers associated with the client to be canceled. When the web page is later terminated on the client, a stop method is initiated and a (stop) message is sent to the server. The stop message causes the server to initiate a disconnection timer for closing the session with the client. If the stop method is not canceled within a predetermined amount of time, the client is disconnected from the server.

24 Claims, 2 Drawing Sheets

METHOD, SYSTEM AND PROGRAM PRODUCT FOR DELAYED DISCONNECTION OF A CLIENT FROM A SERVER

BACKGROUND OF THE INVENTION

1. Technical Field

The present invention generally relates to a method, system and program product for delayed disconnection of a client from a server. Specifically, the present invention allows disconnection of a client from a server to be delayed without unnecessarily consuming system resources.

2. Related Art

As the use of the Internet becomes more pervasive, computer users are increasingly relying on the World Wide Web as a source of information. For example, if a user desires a certain type of information, he/she can access and navigate about the pages of a website from the comfort of his/her own personal computer. One particular form of web-based information exchange that has gained widespread popularity is web portal pages. In general, web portal pages provide a mechanism for a user to receive targeted and personalized content. Typically, a portal page includes sections or visual portlets that each contain particular portal content that is selected and formatted according to a user's preferences. For example, a user could establish his/her own portal page that has sections for news, weather and sports. When the portal page is requested, a portal program on the server would obtain the desired content from the appropriate content providers. Once obtained, the portal content would be aggregated, and then displayed in the appropriate sections as a web portal page. This technology has lead to the explosion of personalized "home" pages for individual web users.

In accessing web pages, a user will typically establish a "session" with a host or server application through a browser. Using the browser, the user will issue a request for a specific web page. The server will then generate and deliver the requested web page to the browser for the user to view. With today's technology it is possible for the user to close the browser or navigate away from the server without disconnecting the session therewith. Delayed disconnection can be advantageous where the user wishes to maintain the session for subsequent browsing. Unfortunately, delayed disconnection can also tie up system resources, and in some cases, prevent the user from logging in again until the session times out after a predetermined period of time (e.g., 30 minutes). The previous solution to this problem was to use Javascript to open a new window upon the browser's "termination event" (e.g., whenever the browser is closed, or leaves a web page). The new window is used to check whether the browser has closed. If so, the new window executes a command to terminate the session. Currently, however, this approach only works with the Internet Explorer 6 web browser. Moreover, it requires a new window to be opened whenever the browser closes or navigates to a new web page. These are both serious limitations since a large number of people utilize different browsers, and pop-up windows are a significant annoyance.

In view of the foregoing, there exists a need for a method, system and program product for delayed disconnection of a client from a server upon browser close. Specifically, a need exists for a connection between a client and a server to be terminated in a delayed fashion without unnecessarily consuming system resources, or generating a pop-up window.

SUMMARY OF THE INVENTION

In general, the present invention provides a method, system and program product for delayed disconnection of a client from a server. Specifically, under the present invention, when a request for a web page is received on a server from a client, the web page is returned to the client with a client program (e.g., an applet) and a program tag. The program tag specifies a session identifier corresponding to the client. Once the web page is loaded, a start method is initiated on the client to cause a start message to be sent to the server. The start message includes the session identifier and causes/instructs the server to cancel any disconnection timers associated with the client that might be running. When the web page is later terminated on the client (e.g., when the browser is closed, or the user navigates to a new website), a stop method is initiated to cause a (stop) message to be sent to the server. The stop message causes/instructs the server to initiate a disconnection timer for closing the session with the client. If the stop method (or the running disconnection timer) is not canceled within a predetermined amount of time, the client is disconnected from the server.

A first aspect of the present invention provides a method for delayed disconnection of a client from a server, comprising: receiving a web page on the client with a client program and a program tag, wherein the program tag specifies a session identifier corresponding to the client; initiating a first method on the client when the web page is loaded to cancel a first disconnection timer associated with the client on the server; terminating the web page on the client; and initiating a second method on the client to start a second disconnection timer associated with the client, wherein the client is disconnected from the server if the second method is not canceled within a predetermined amount of time.

A second aspect of the present invention provides a method for delayed disconnection of a client from a server, comprising: receiving a request for a web page on the server from the client; returning the web page to the client with a client program and a program tag, wherein the program tag includes a session identifier corresponding to the client; receiving a first message from the client to cancel a first disconnection timer associated with the client after the web page is loaded on the client, wherein the first message includes the session identifier; checking a hashtable on the server for the first disconnection timer based on the session identifier in the first message; and canceling the first disconnection timer if the first disconnection timer is present in the hashtable.

A third aspect of the present invention provides a system for delayed disconnection of a client from a server, comprising: a request system for receiving a request for a web page on the server from the client; a response system for returning the web page to the client with a client program and a program tag, wherein the program tag includes a session identifier corresponding to the client; and a timer cancellation system for canceling a first disconnection timer associated with the client in response to a first message received from the client after the web page is loaded, wherein the first disconnection timer is associated with the client in a hashtable on the server based on the session identifier.

A fourth aspect of the present invention provides a program product stored on a recordable medium for delayed disconnection of a client from a server, which when executed comprises: program code for receiving a request for a web page on the server from the client; program code for returning the web page to the client with a client program and a program tag, wherein the program tag includes a session identifier corresponding to the client; and program code for canceling a first disconnection timer associated with the client in response to a first message received from the client after the web page is loaded, wherein the first disconnection timer is associated with the client in a hashtable on the server based on the session identifier.

Therefore, the present invention provides a method, system and program product for delayed disconnection of a client from a server.

BRIEF DESCRIPTION OF THE DRAWINGS

These and other features of this invention will be more readily understood from the following detailed description of the various aspects of the invention taken in conjunction with the accompanying drawings in which.

Figure 1:
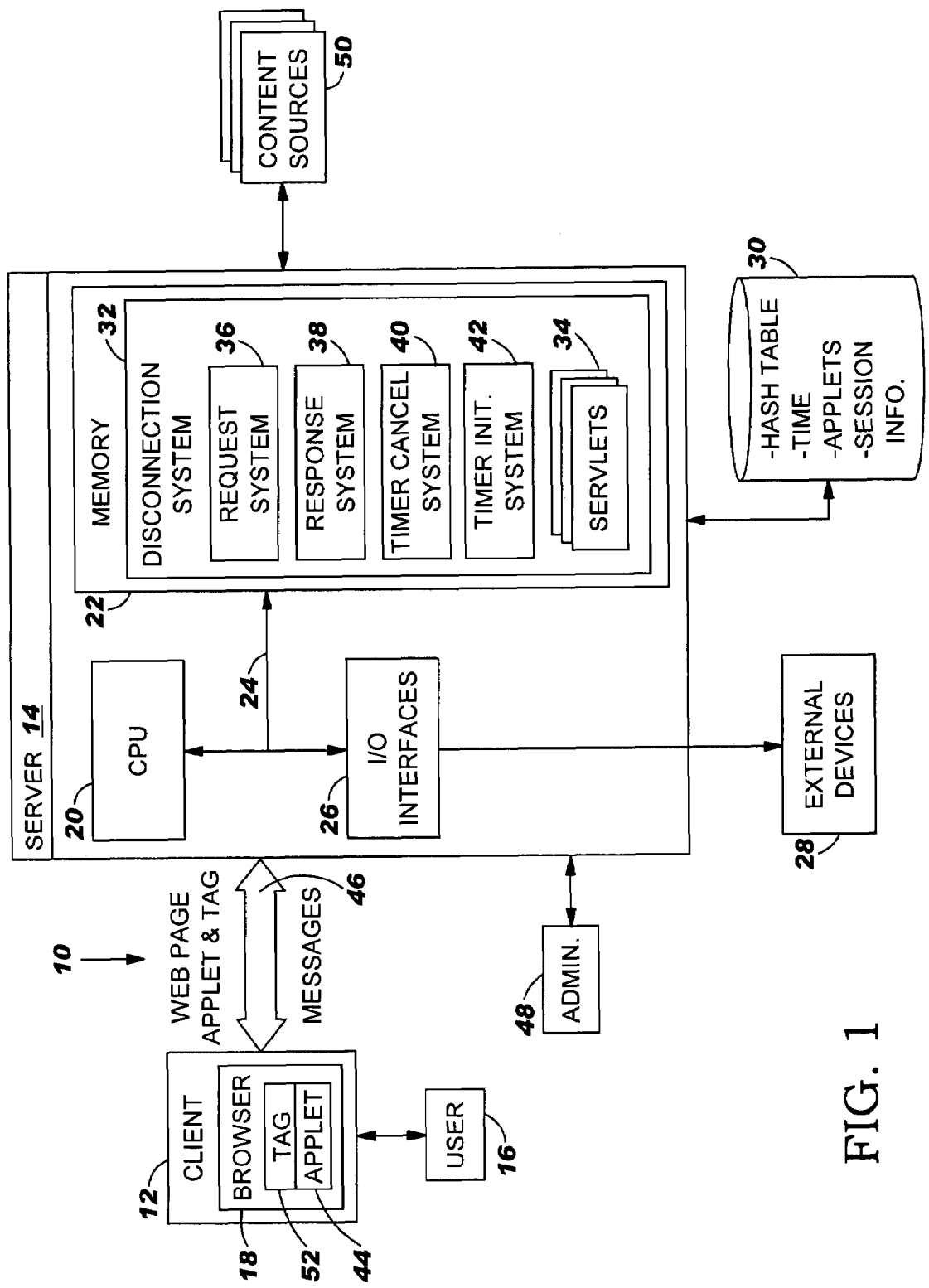
FIG. 1 depicts a system delayed disconnection of a client from a server according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system and program product for delayed disconnection of a client from a server. Specifically, under the present invention, when a request for a web page is received on a server from a client, the web page is returned to the client with a client program (e.g., an applet) and a program tag. The program tag specifies a session identifier corresponding to the client. Once the web page is loaded, a start method is initiated on the client to cause a start message to be sent to the server. The start message includes the session identifier and causes/instructs the server to cancel any disconnection timers associated with the client that might be running. When the web page is later terminated on the client (e.g., when the browser is closed, or the user navigates to a new website), a stop method is initiated to cause a (stop) message to be sent to the server. The stop message causes/instructs the server to initiate a disconnection timer for closing the session with the client. If the stop method (or the running disconnection timer) is not canceled within a predetermined amount of time, the client is disconnected from the server. Accordingly, the present invention provides delayed disconnection without unnecessarily consuming system resources, or requiring a pop-up window.

It should be understood in advance that although the present invention is described as providing delayed disconnection of a "client" from a "server," it could also be used to provide delayed disconnection of a "client" from a "host." Specifically, although it is common for the "server" to transform a local application and therefore be the "host," products such as the Host Access Transformation Server product (commercially available from International Business Machines Corp. of Armonk, N.Y.) allow a "host" to be separate from a "server." Therefore, the present invention can provide delayed disconnection from either a "server" or a "host."

Referring now to FIG. 1, a system 10 for delayed disconnection of a client 12 from a server 14 is shown. Under the present invention, client 12 and server 14 can represent any type of computerized systems. For example, client 12 and/or server 14 could be a personal computer, workstation, laptop, hand held device, etc. In general, client 12 communicates with server 14 over a network 46. As will be further described below network 46 can be any type of public network such as the Internet, or any type of private network such as a local area network (LAN), wide area network (WAN), a virtual private network (VPN), etc. Typically, server 14 can be an application server, portal server or web server that delivers web pages to client 12. In any event, a user 16 will operate a web browser 18 on client 12 to request a web page from server 14. One or more programs such as servlets 34 on server 14 will generate the web page by obtaining the necessary content from one or more content sources 50. Once generated, the web page is sent back to the requesting client 12 for display in browser 18.

As shown, server 14 generally comprises central processing unit (CPU) 20, memory 22, bus 24, input/output (I/O) interfaces 26, external devices/resources 28 and storage unit 30. CPU 20 may comprise a single processing unit, or be distributed across one or more processing units in one or more locations, e.g., on a client and computer system. Memory 22 may comprise any known type of data storage and/or transmission media, including magnetic media, optical media, random access memory (RAM), read-only memory (ROM), a data cache, a data object, etc. Moreover, similar to CPU 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LCD screen, hand-held device, keyboard, mouse, voice recognition system, speech output system, printer, monitor/display, facsimile, pager, etc. Bus 24 provides a communication link between each of the components in server 14 and likewise may comprise any known type of transmission link, including electrical, optical, wireless, etc.

Storage unit 30 can be any system (e.g., a database) capable of providing storage for information under the present invention. Such information could include, among other things, hashtables, time limits, client programs (e.g., applets), session information, etc. As such, storage unit 30 could include one or more storage devices, such as a magnetic disk drive or an optical disk drive. In another embodiment, storage unit 30 includes data distributed across, for example, a local area network (LAN), wide area network (WAN) or a storage area network (SAN) (not shown).

It should be understood that client 12 will typically include computerized components (e.g., CPU, memory, etc.) similar to server 14. Such components have not been shown for brevity purposes. In any event, as indicated above, the teachings of the present invention are typically implemented in a network environment such as over the Internet, a wide area network (WAN), a local area network (LAN), a virtual private network (VPN), etc. To this extent, communication between client 12 and server 14 could occur via a direct hardwired connection (e.g., serial port), or via an addressable connection that may utilize any combination of wireline and/or wireless transmission methods. Server 14 and client 12 may utilize conventional network connectivity, such as Token Ring, Ethernet, WiFi or other conventional communications standards. Moreover, connectivity could be provided by conventional TCP/IP sockets-based protocol. In this instance, client 12 would utilize an Internet service provider to establish connectivity to server 14.

Shown in memory 24 is disconnection system 32 and servlets 34. Disconnection system 32 provides delayed disconnection of client 12 from server 14 and includes request system 36, response system 38, timer cancellation system 40 and timer initiation system 42. It should be appreciated that various other programs for delivering web pages to client 12 could be implemented on server 14. For example, disconnection system 32 and/or servlets 34 could be implemented in conjunction with, or include components of programs such as WebSphere Application Server, WebSphere Portal Server and/or Host Access Transformation server, all of which are commercially available from International Business Machines Corp. of Armonk, N.Y. Such programs have not been shown in FIG. 1 for brevity purposes.

In any event, when user 16 desires to view a web page, user 16 will issue a request for the web page using browser 18. The request will be communicated over network 46 and received by server 14. Request system 36 will receive the request and call one or more servlets 34 to generate the requested web page. Servlets 34 can interact with one or more content sources 50 to obtain the necessary information for the web page. Once the web page has been generated response system 38 will send the same back to client 12 with a client program (shown as applet 44) and a program tag 52. It is understood that although in a typical embodiment the client program is an applet 44 that works in conjunction with one or more servlets 34, the present invention need not be implemented using the JAVA programming language and than other equivalents are possible. In any event, program tag 52 typically includes a session identifier corresponding to client 12 (i.e., the session between client 12 and server 14).

Upon receipt, client 12 will store applet 44 and program tag 52 (e.g., in browser 18), and begin loading the web page. Once the web page is loaded in browser 18, a start method within applet 44 will be initiated/called. Upon initiation, a start message will be generated and sent from client 12 to server 14. Specifically, the start method creates a socket, and sends a start message to server 14 that includes the session identifier and a flag indicating that any disconnection timers associated with client 12 should be canceled. To this extent, the start message will be received by timer cancellation system 40, which will first determine whether any disconnection timers associated with client 12 are running. Under the present invention, a disconnection timer can be a counter or the like that causes a corresponding connection between server 14 and a particular client 12 to be closed upon reaching a predetermined count or time (e.g., which can be set by an administrator 48). In general, any running disconnection timers are maintained in a hashtable or the like (e.g., as stored in storage unit 30) according to session identifiers. Under the present invention, timer cancellation system 40 will access the hashtable and use the session identifier received with the start message to determine whether any disconnection timers associated with client 12 are running. If a disconnection timer is found, it is canceled. Conversely, if no disconnection timer is found, no further action need be taken by timer cancellation system 40. If a disconnection timer did exist and was not canceled, client 12 would be disconnected from server 14 once the timer "expired."

When the web page is later terminated a stop method within applet 44 is initiated/called. Under the present invention, the web page is typically terminated when browser 18 is closed, or user 16 navigates to a different website. In any event, the stop method causes a stop message to be sent to server 12. Similar to the start message, the stop message includes the session identifier. Conversely, however, the stop message includes a flag indicating that the connection between client 12 and server 14 should be terminated in a predetermined amount of time (e.g., 10 seconds as set by administrator 48). Upon receipt of the stop message, timer initiation system 42 adds a disconnection timer to the hashtable, cross-referenced to the session identifier. If the timer reaches the predetermined period of time without being canceled, client 12 is disconnected from server 14. Typically, the stop method/disconnection timer can be canceled by reopening browser 18, or requesting a new web page within the same website as the original web page within the predetermined amount of time.

Figure 2:
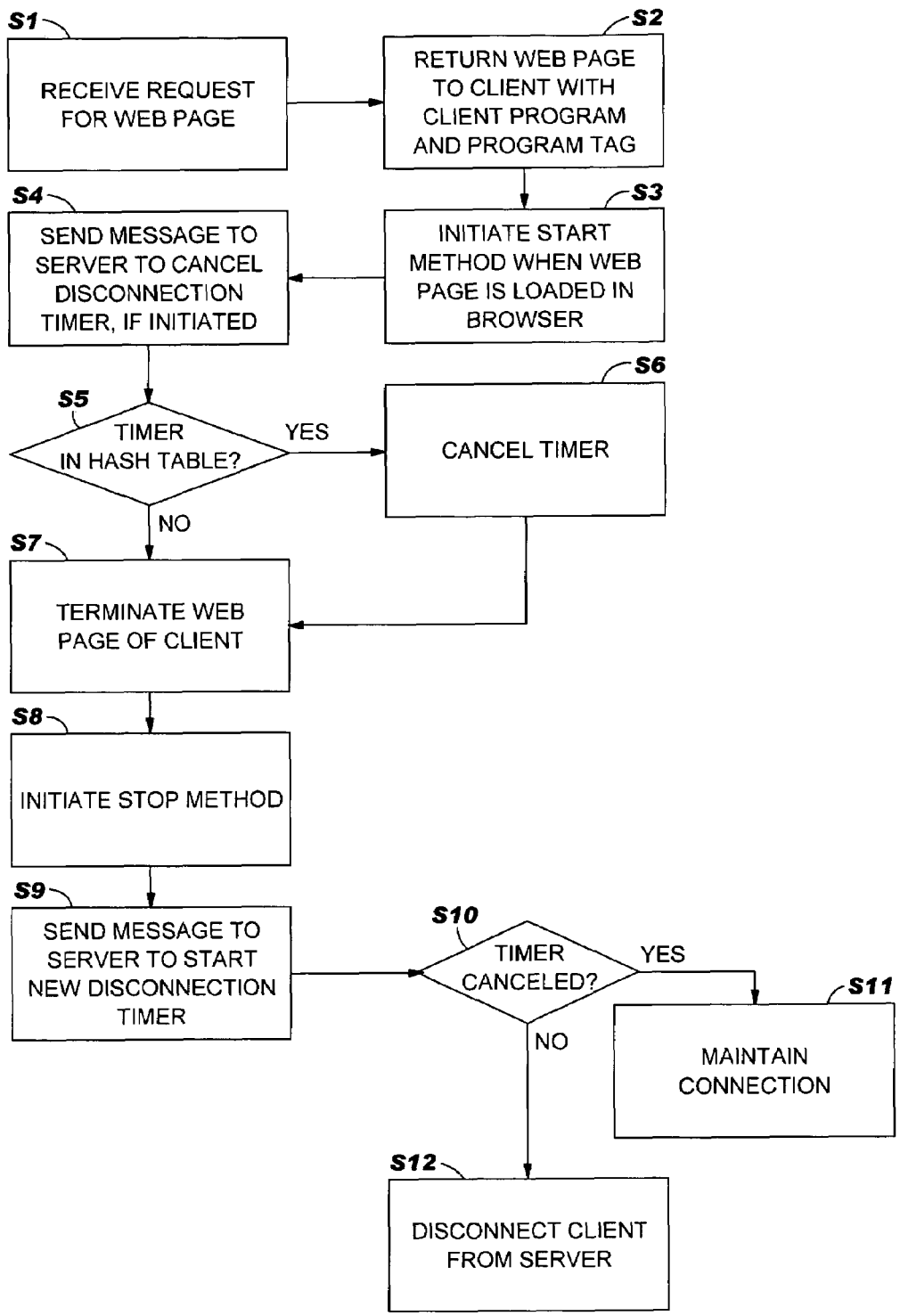
FIG. 2 depicts method flow diagram according to the present invention.

Referring now to FIG. 2, a method flow diagram 100 according to the present invention is shown. In first step S1, the client requests a web page. In step S2, the web page is returned to the client with a client program and a program tag. In step S3, a start method is initiated from the client program after the web page is loaded. In step S4, a start message is sent from the client to the server to cancel any associated disconnection timers. In step S5, it is determined whether there are any associated disconnection timers in the hashtable. If so, the disconnection timer is canceled in step S6. If not, the server will await termination of the web page on the client in step S7. As indicated above, termination of the web page under the present invention generally includes either closing of the browser, or navigation to a different website. Upon such termination, a stop method is initiated in step S8. The stop method causes a stop message to be sent to the server in step S9 to start a disconnection timer. In step S10, it is determined whether the disconnection timer was canceled in the predetermined amount of time. If not, the client is disconnected from the server in step S11. However, if disconnection timer was canceled, the connection is maintained in step S12.

It should be appreciated that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, as indicated above, although in a typical embodiment the present invention is implemented using the JAVA programming language, this need not be the case.

I claim:

1. A method for delayed disconnection of a client from a server, comprising:
    receiving a web page on the client with a client program and a program tag, wherein the program tag specifies a session identifier corresponding to the client;
    initiating a first method on the client when the web page is loaded to cancel a first disconnection timer associated with the client on the server;
    terminating the web page on the client; and
    initiating a second method on the client to start a second disconnection timer associated with the client, wherein the client is disconnected from the server if the second method is not canceled within a predetermined amount of time.

2. The method of claim 1, wherein the terminating step comprises requesting a new web page from the server, and wherein the stop method is canceled when the new web page is loaded on the client.

3. The method of claim 1, wherein the second method is not canceled if the web page is terminated by closing a browser on the client in which the web page is loaded.

4. The method of claim 1, wherein the client program is an applet.

5. The method of claim 1, further comprising:
    receiving a request for the web page on the server; and
    processing the request with a servlet to return the web page, the client program and the program tag to the client, prior to the receiving step.

6. The method of claim 1, wherein the step of initiating a first method comprises:
    communicating a message that includes the session identifier from the client to the server;
    referencing a hashtable on the server based on the session identifier to identify the first disconnection timer; and
    canceling the first disconnection timer if identified in the hashtable.

7. The method of claim 1, wherein the step of initiating a stop method step comprises:
    communicating a message that includes the session identifier from the client to the server; and
    starting the second disconnection timer in a hashtable, wherein the second disconnection timer is associated with the client in the hashtable based on the session identifier.

8. The method of claim 1, wherein the predetermined amount of time is established on the server.

9. A method for delayed disconnection of a client from a server, comprising:
    receiving a request for a web page on the server from the client;
    returning the web page to the client with a client program and a program tag, wherein the program tag includes a session identifier corresponding to the client;
    receiving a first message from the client to cancel a first disconnection timer associated with the client after the web page is loaded on the client, wherein the first message includes the session identifier;
    checking a hashtable on the server for the first disconnection timer based on the session identifier in the first message; and
    canceling the first disconnection timer if the first disconnection timer is present in the hashtable.

10. The method of claim 9, wherein the first message is sent from the client to the server pursuant to initiation of a first method on the client after the web page is loaded, and wherein the first method is initiated from the client program received on the client with the web page.

11. The method of claim 9, wherein the first disconnection timer is maintained in the hashtable and is associated with the client based to the session identifier.

12. The method of claim 9, further comprising receiving a second message from the client, wherein the second message causes the server to start a second disconnection timer after the web page is terminated on the client, and wherein the client is disconnected from the server if the second disconnection timer is not canceled within a predetermined amount of time.

13. The method of claim 12, wherein the second disconnection timer is canceled if the client requests and loads a new web page.

14. The method of claim 12, wherein the second message is sent from the client to the server pursuant to initiation of a second method on the client, and wherein the second method is initiated from the client program received on the client with the web page.

15. The method of claim 12, wherein the second disconnection timer is maintained in the hashtable and is associated with the client based on the session identifier.

16. The method of claim 12, wherein the client is disconnected from the server if a browser into which the web page is loaded on the client is closed.

17. A program product stored on a computer readable storage medium for delayed disconnection of a client from a server, which when executed by a processor comprises:
    program code for receiving a request for a web page on the server from the client;
    program code for returning the web page to the client with a client program and a program tag, wherein the program tag includes a session identifier corresponding to the client; and
    program code for canceling a first disconnection timer associated with the client in response to a first message received from the client after the web page is loaded, wherein the first disconnection timer is associated with the client in a hashtable on the server based on the session identifier.

18. The program product of claim 17, wherein the first message is sent from the client to the server pursuant to initiation of a first method on the client after the web page is loaded, and wherein the first method is initiated from the client program received on the client with the web page.

19. The program product of claim 17, wherein the session identifier is included in the first message.

20. The program product of claim 17, further comprising program code for starting a second disconnection timer in response to a second message received from the client, wherein the second message causes the server to start the second disconnection timer after the web page is terminated on the client, and wherein the client is disconnected from the server if the second disconnection timer is not canceled within a predetermined amount of time.

21. The program product of claim 20, wherein the second disconnection timer is canceled if the client requests and loads a new web page.

22. The program product of claim 20, wherein the second message is sent from the client to the server pursuant to initiation of a second method on the client, and wherein the second method is initiated from the client program received on the client with the web page.

23. The program product of claim 20, wherein the second disconnection timer is maintained in the hashtable and is associated with the client based on the session identifier.

24. The program product of claim 20, wherein the client is disconnected from the server if a browser into which the web page is loaded on the client is closed.

* * * * *